United States Patent Office 3,424,989
Patented Jan. 28, 1969

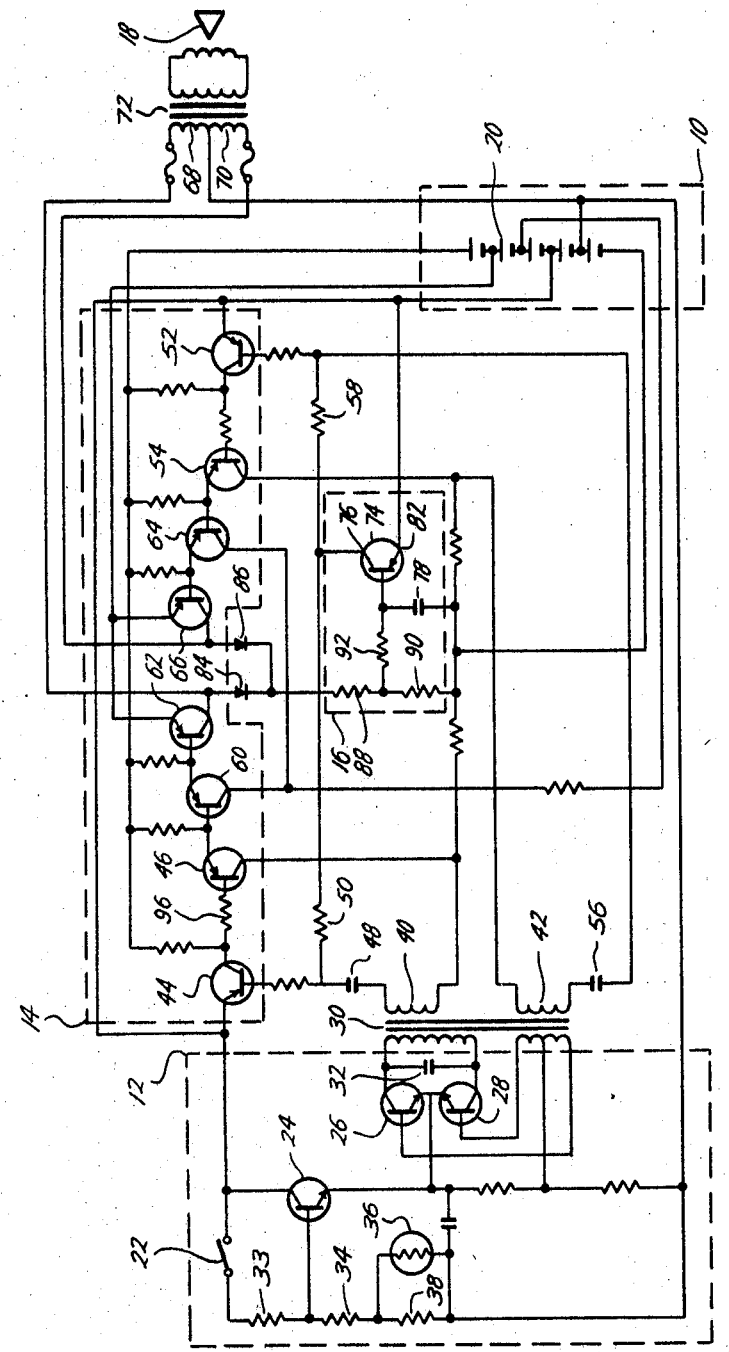

3,424,989
CIRCUIT FOR CONSERVING BATTERY POWER BY ELIMINATING THE THIRD HARMONIC OF AN ELECTRICAL SQUARE WAVE
Louis W. Erath and Algernon S. Badger, Houston, Tex., assignors to Tideland Signal Corporation, Houston, Tex., a corporation of Texas
Filed May 19, 1964, Ser. No. 368,575
U.S. Cl. 328—165           2 Claims
Int. Cl. H03b 1/04; H03k 5/04

ABSTRACT OF THE DISCLOSURE

A circuit for conserving battery power by eliminating the third harmonic having a battery powered oscillator producing a standard electrical square wave including means for reducing the pulse width of the 180 electrical degrees to 120 electrical degrees. A battery powered electrical horn having an oscillator connected to the battery for providing a square wave output in which the pulse width is approximately 180 electrical degrees which is passed through a pulse width modifying means for reducing the pulse width of the square wave to approximately 120 degrees and connecting the output of the modifying means to an electrical horn. Circuit means for increasing the pulse width as the battery voltage decreases thereby holding the average output power relatively constant.

---

Figure 1:
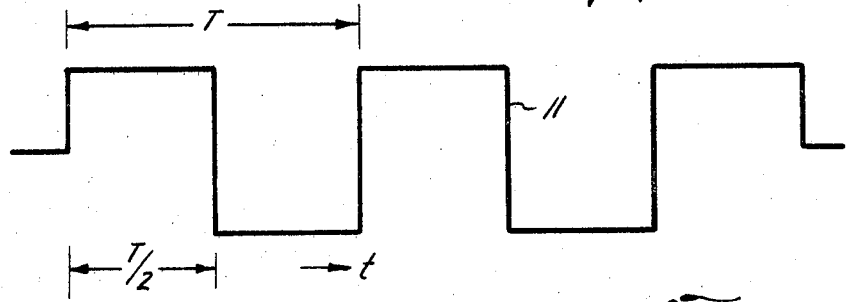

The present invention relates to a method of and an apparatus for regulating the pulse width of an electrical square wave, and more particularly, relates to such a method and apparatus in which a conventional electrical square wave is changed to a modified square wave to provide a more desirable wave form for particular uses.

In many electrical applications, it is more efficient to utilize square waves instead of sine waves, for instance in connection with the use of transistors. However, the square wave form is generally considered as mathematically including the fundamental frequency plus the odd harmonics. However, in many applications the harmonic components of the square wave serve no useful purpose but still require the generation of and consequential loss of power.

The present invention is generally directed to a method of and an apparatus for modifying the shape of the square wave in order to eliminate the third harmonic thereby providing a more efficient wave form for particular applications in which the third harmonic performs no useful function.

A still further object of the present invention is the provision of a method and an apparatus for regulating the pulse width of an electrical square wave by changing the pulse width from 180 electrical degrees to approximately 120 electrical degrees thereby eliminating the third harmonic.

Yet a still further object of the present invention is the provision of a method of and an apparatus for regulating the pulse width of a square wave which is being amplified from a battery source of power by reducing the pulse width of the square wave from 180 electrical degrees to slightly less than 120 electrical degrees and as the voltage of the battery decreases due to old age or low temperatures to slightly increase the pulse width of the square wave so as to hold the average power relatively constant in spite of the drop in battery voltage.

Yet a further object of the present invention is the provision of a method of and an apparatus for regulating the pulse width of a conventional square wave by providing an oscillator having a square wave output, a push pull amplifier having a signal input connected to the oscillator output, and a pulse width circuit connected to each half of the push pull amplifier to shut off each half of the amplifier after approximately 120 electrical degrees of conduction.

Still a further object of the present invention is the provision of a method of and an apparatus for regulating the pulse width of a conventional square wave by providing an oscillator having a square wave output, a push pull amplifier having a signal input connected to the oscillator output, the amplifier including a pair of one shot multivibrators, and a timing circuit connected between the output of the amplifier and each of the multivibrators in which the timing circuit shuts off each of the multivibrators after approximately 120 electrical degrees of conduction.

A still further object of the present invention is the provision of a method of and an apparatus for eliminating the third harmonic from a square wave by eliminating the first and last thirty electrical degrees of each half cycle.

Figure 2:
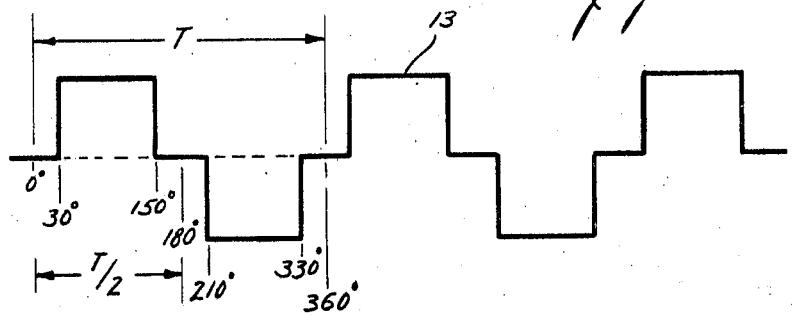
Figure 3:
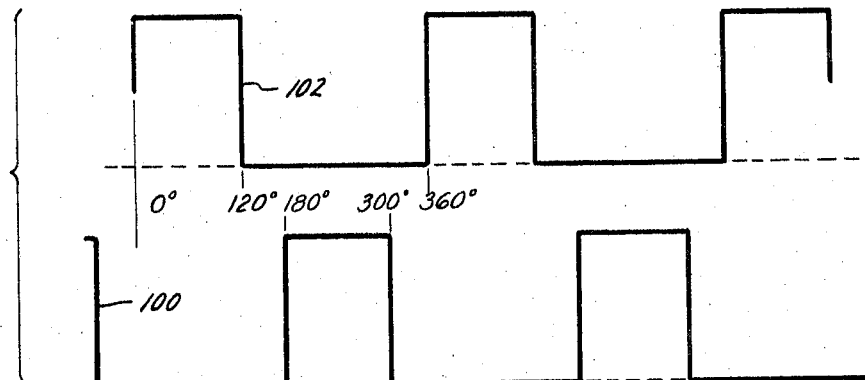

Other and further objects, features and advantages of the invention will be apparent from the following description of a presently preferred embodiment of the invention, given for the purposes of disclosure and taken in conjunction with the accompanying drawings, where like character references designate like parts throughout the several views, and where, FIGURE 1 is a representation of a conventional square wave form, FIGURE 2 is a representation of a modified square wave form provided by the present invention for eliminating the third harmonic by reducing the pulse width to approximately 120 electrical degrees, FIGURE 3 is a representation of the wave form resulting from each of the multivibrators in the amplifier of the present invention, and FIGURE 4 is an electrical schematic of one form of the present invention in use for providing a signal for operation of a foghorn.

A conventional electrical square wave form is used in many electrical applications. For instance, transistors are more efficient in use as switching devices and thus it is preferable to use a square wave instead of a sine wave form to actuate transistors. Mathematically a square wave form is generally represented as including the fundamental frequency and the odd harmonics. However, in some applications the harmonic components of the square wave are of no useful value. By way of example only, a speaker designed for use in a 400 cycle foghorn is not responsive to the harmonic frequencies and therefore the power used in producing these harmonics is wasted. This wasted power becomes important when the installation is powered by a battery and is located at remote installations such as offshore foghorn signal installations.

A conventional square wave form 11, as best seen in FIGURE 1, consists of alternate half cycles of 180 electrical degrees in pulse width and are rectangular or square shaped. However, it has been found that if the square wave shape is modified to provide the wave form 13, as best seen in FIGURE 2, that a more efficient wave form is provided in those application in which the third harmonic performs no useful function. That is, the wave form 13 is a modified square wave in which the pulse width instead of being 180 electrical degrees for each half cycle is approximately 120 electrical degrees for each half cycle. Therefore, the power enclosed by the wave form 13 is reduced from that enclosed by the wave form 11. Thus, the effective power required to produce the modified wave form 13 is approximately one-third less than the power required to produce the square wave form 11 in FIGURE 1. However, the useful power or power required in certain applications is satisfied by the use of the modified wave form 13. That is, in those applications in which the third harmonic performs no useful purpose, the modified wave form 13 since it eliminates the third harmonic, and thus does not require the power to produce this unwanted component, provides a more efficient wave form.

The fact that the modified 120 electrical degree wave form 13 shown in FIGURE 2 eliminates the third harmonic can be shown mathematically.

A square wave of voltage is analyzed in terms of its Fourier series to give:

$$E = \frac{4}{\pi}\sin 2\pi\left(\frac{1t}{T}\right) + \frac{4}{3\pi}\sin 2\pi\left(\frac{3t}{T}\right) + \frac{4}{5\pi}\sin 2\pi\left(\frac{5t}{T}\right) + \frac{4}{\pi}\frac{1}{n_{odd}}\sin 2\pi\left(\frac{n_{odd}t}{T}\right)$$

or a series of odd harmonics where the amplitudes are related to the fundamental amplitude by $1/n_{odd}$. Thus the amplitude of the 3rd harmonic is ⅓ that of the fundamental and in an application where the impedance to the third harmonic is small, heavy currents and power are required for the third harmonic. The higher harmonics have less amplitude, e.g. The 5th is ⅕ the fundamental, and therefore are of less significance even if the impedance to the fifth harmonic is small.

A means of eliminating the third harmonic, which is creating the most loss of power, is the use of a pulsed wave of special time duration.

Thus, consider the wave form 13 of FIGURE 2, a pulse that has the same period as the original wave 11 (FIGURE 1), but is composed of two shorter pulses.

While any starting angle may be chosen, for purposes of convenient mathematical analysis, the beginning pulse is chosen after 30° have elapsed and cuts off again at 150°. The negative pulse likewise is delayed 30° and ends 30° short of 360°.

The Fourier analysis for the 3rd harmonic when $\theta$ is the electrical angular degree and $A_3$ and $B_3$ are third harmonic magnitude coefficients is:

$$A_3 = \frac{1}{\pi}\int_0^{360°} F\sin 3\theta\, d\theta$$

$F = 1$ for $\theta$ between 30° and 150°
$\quad = -1$ for $\theta$ between 210° and 330°

$$A_3 = \frac{1}{\pi}\int_{30°}^{150°}\sin 3\theta\, d\theta + \frac{1}{\pi}\int_{210°}^{330°}-\sin 3\theta\, d\theta$$

$$= \frac{1}{3\pi}(-\cos 3\theta)\Big|_{30°}^{150°} + \frac{1}{\pi}(\cos 3\theta)\Big|_{210°}^{330°}$$

$A_3 = 0$ since $\cos 90° = 0$
$\cos 450° = 0$
$\cos 630° = 0$
$\cos 990° = 0$

As above $$B_3 = \frac{1}{\pi}\int_{30°}^{150°}\cos 3\theta\, d\theta + \frac{1}{\pi}\int_{210°}^{330°}-\cos 3\theta\, d\theta$$

$$= \frac{1}{3\pi}\sin 3\theta\Big|_{30°}^{150°} - \frac{1}{3\pi}\sin 3\theta\Big|_{210°}^{330°}$$

$$= \frac{1}{3\pi}[1-1-(-1+1)]$$

$B_3 = 0$

Now the fundamental amplitude is:

$$A_1 = \frac{1}{\pi}\int_{30°}^{150°}\sin\theta\, d\theta + \frac{1}{\pi}\int_{210°}^{330°}-\sin\theta\, d\theta$$

$$= \frac{1}{\pi}(\cos\theta)\Big|_{210°}^{150°} + \frac{1}{\pi}\cos\theta\Big|_{210°}^{330°}$$

$$= \frac{1}{\pi}(\sqrt{3}+\sqrt{3})$$

$$= \frac{2\sqrt{3}}{\pi} = \frac{3.464}{\pi}, \quad B_1 = 0 \text{ by symmetry}$$

Therefore, the fundamental amplitude is reduced only 13% while the 3rd is eliminated completely and the total power requirement is reduced approximately one third. The output of the fundamental is restored by a small increase in the amplitude of the pulse.

While the modified square wave form of the present invention may be utilized for other purposes, by way of example only, it will be described in connection with its use in powering a 400 cycle foghorn signal.

Referring now to FIGURE 4, the present invention may generally include a suitable power supply 10, a conventional square wave oscillator 12, a push pull amplifier circuit 14, a pulse width or timing circuit 16, and a suitable load 18 here shown as the driver of a 400 cycle foghorn for use in offshore installations. Since the foghorn signal is to be used offshore at relatively inaccessible locations, the power supply 10 preferably includes a suitable battery 20 which includes a plurality of cells which can provide suitable voltages.

The oscillator 12 may be any conventional square wave oscillator which produces the square wave form 11 shown in FIGURE 1. For instance, the square wave oscillator 12 may include a switch 22 which may be a timer and which when closed actuates transistor 24 thereby supplying voltage to the oscillator transistors 26 and 28 and thus to the primary of transformer 30 as well as to condenser 32. Thus, oscillator 12 is a conventional saturating core oscillator and in connection with its use with a foghorn may generate a 400 cycle square wave. The frequency of the oscillator 12 is proportional to the voltage applied to it by transistor 24 which may be adjusted by suitably selecting the divider made up of resistors 33 and 34. The thermistor 36 and resistor 38 are used for temperature compensation of the oscillator frequency. However, it is to be understood that any suitable square wave producing oscillator may be suitable for supplying a conventional square wave form to the transformer 30. Thus, on the secondaries 40 and 42 of a transformer 30 a square wave form will be provided wherein the form is that as shown in FIGURE 1 in which the pulse width of the half cycle waves is 180 electrical degrees.

Thus, the push pull amplifier circuit 14 receives the conventional square wave and in combination with the pulse width or timing circuit 16 modifies the square wave to generate a 120 electrical degree duration square wave form or pulse width 13, as best seen in FIGURE 2. Generally, the push pull amplifier circuit 14 includes two one-shot multivibrators arranged in a push pull circuit. Thus, transistors 44 and 46 together with capacitor 48 and resistor 50 form one of the multivibrators which is connected to the secondary 40 of transformer 30. The other multivibrator includes transistors 52 and 54 together with capacitor 56 and resistor 58, and this latter multivibrator is connected to the secondary winding 42 of the transformer 30.

The other transistors in the amplifier circuit are merely conventional current amplifiers. Thus, transistors 60 and 62 amplify conventionally the output from the one multivibrator and apply this amplified output to one half 68 of the primary of transformer 72. Transistors 64 and 66 conventionally amplify the current output from the other multivibrator and apply this amplified output to the second half 70 of the primary of transformer 72.

The timing circuit 16 includes transistor 74. Thus, the timing of the multivibrator containing transistors 44 and 46 is controlled by capacitor 48, resistor 50 and the potential applied to the bottom of the resistor 50 by the timing or pulse width transistor 74. Similarly, the other half of the push pull amplifier circuit which contains the multivibrator having transistors 52 and 54 is controlled by capacitor 56, resistor 58 and also by the potential applied to the bottom of resistor 58 by the pulse width or timing transistor 74. The voltage on the collector 76 of transistor 74 is controlled by comparing a DC voltage which is developed across capacitor 78 and applied to the base of the transistor 74 with the nine volt reference potential taken from the battery 20 and applied to the emitter 82 of the transistor 74. The voltage which is developed across the capacitor 78 is provided from the primary of the output transformer 72 from windings 68 and 70 and across diodes 84 and 86. Resistors 88 and 90 are provided to have a value which is small as compared with resistor 92 so that the potential fed to capacitor 78 will be proportional to the average and not the peak value of the signal from the primary coils 68 and 70 of the transformer 72.

It is also to be noted that the voltage appearing across the primary of the transformer 72 is equal to the output voltage of the 15 volt tap of the battery 20. The voltage appearing across the 15 volt tap of the battery 20 is at a maximum when the battery is in the new condition; however, this voltage decreases as the battery ages or at low voltage, and in the ordinary case becomes approximately 13½ volts. However, as this battery voltage decreases due to age or low temperatures, the voltage across condenser 78 in the pulse width of timing circuit 16 will thus decrease causing the pulse width from the amplifier 14 to increase somewhat thereby holding the average power output from the amplifier 14 relatively constant. The circuits therefore, not only provide a pulse width which is approximately equal to the optimum value of 120 electrical degrees for eliminating the third harmonic, but also provides a slight variation in the pulse width to compensate for battery voltage variations to provide for a constant power output.

In operation, in providing a circuit to operate the driver 18 of a foghorn, certain minimum power requirements must be met to maintain the output signal at the required level. Also, since offshore foghorn installations are relatively inaccessible, and battery powered, it is desirable that they have as long a life as possible so as to decrease the maintenance and replacement costs. As has been previously been mentioned while the present invention has other applications, it is also advantageous in use with a foghorn as the foghorn driver is not efficient at harmonic frequencies. That is, the driver 18 is not mechanically responsive to these harmonic frequencies and therefore the battery power required to produce these harmonics is wasted and have the disadvantage of shortening battery life which is particularly unsatisfactory when it is desired to decrease the replacement time and costs involved in offshore installations. However, the present pulse width regulating circuit modifies the conventional square wave form 11, as best seen in FIGURE 1, to that shown as square wave form 13 in FIGURE 2. The form shown in FIGURE 2 eliminates the unwanted and unused third harmonic, and yet only requires approximately ⅔ of the power of the wave form 11 of FIGURE 1 without reducing the foghorn sound output level.

Therefore, assuming that the oscillator 12, which is conventional, is providing a square wave form 11 across the primary winding of the transformer 30 the cycle is initiated from the secondary windings 40 and 42 on the transformer 30. First, taking the actuation of the one-shot multivibrator which includes transistors 44 and 46, and assuming that the current flow through winding 40 and condenser 48 is in a positive direction, transistor 44, which is of the NPN type, is switched on. This causes a negative flow of current through resistor 96 at the base of transistor 46 thereby switching on transistor 46 which in turn feeds back a positive going voltage through transformer winding 40. Winding 40 continues to supply a positive potential to the base of transistor 44 until capacitor 48 becomes fully charged. The time required for capacitor 48 to become fully charged is dependent upon the value of resistor 50 as well as the voltage supplied from the collector 76 of the transistor 74. However, the collector voltage on transistor 74 is controlled by comparing a DC voltage which is developed across the capacitor 78 with the nine volt reference potential taken from the battery 20. And the voltage developed across the capacitor 78 is generated by diodes 84 and 86 which receive their potential from the primary coils 68 and 70 of the output transformer 72.

These values are so chosen and the potential so adjusted by transistor 74 as to shut off the one shot multivibrator comprised of transistors 44 and 46 after approximately 120 electrical degrees of conduction have passed. This produces a wave form at the emitter of transistor 46 in the form 100 as shown at FIGURE 3 which is further amplified by transistors 60 and 62 and transmitted to the lead through transformer 72.

During the time that the wave form 100 is produced from the one shot multivibrator composed of transistors 44 and 46 the second one shot multivibrator consisting of transistors 52 and 54 has been nonconducting since the voltage going through the transformer winding 42 of the transformer 30 has been negative across the base of the transistor 52. However, as soon as the voltage in windings 40 and 42 goes negative, the first multivibrator will remain nonconducting (since it has been nonconducting after the first 120 electrical degrees), and now a positive potential will be applied to the base of transistor 52 switching it on and in turn causing the transistor 54 to be switched on which feeds back a positive going voltage to the winding 42. Winding 42 continues to supply a positive potential to the base of transistor 52 until capacitor 56 becomes fully charged. Similar to the first multivibrator, the time required for the capacitor 56 to become fully charged is dependent upon the value of resistor 58 as well as the voltage which is supplied by the collector of the pulse width or timing transistor 74. And similar to the first multivibrator, these values are chosen and the potential so adjusted by the transistor 74 so as to be also shut off the one shot multivibrator consisting of transistors 52 and 54 after 120 electrical degrees of conduction have passed. Thus, a wave form 102 is provided at the emitter of the transistor 54 which is then amplified by transistors 64 and 66 and transmitted to the load through the transformer 72.

As has been previously mentioned, it is desirable to shut off the one shot multivibrators after approximately 120 electrical degrees of conduction in order to provide the wave form 13 as shown in FIGURE 2 thereby eliminating the third harmonic from the conventional square wave 11 as shown in FIGURE 1. However, it is also desirable in utilizing this particular circuit with a foghorn to insure that the horn blows at a constant sound level even when the supply voltage derived from battery 20 decreases due to old age or low temperatures. That is, the voltage appearing across the primary of transformer 72 is equal to the voltage on the 15 volt tap of battery 10 and it is at a maximum when the battery is in a new condition but decreases due to old age or low temperatures, say to approximately 13½ volts. Since the voltage appearing across the condenser 78 which controls the conduction of the transistor 74 which in turn controls the timing or pulse width of the modified square wave 13, as seen in FIGURE 2, it is preferable to adjust the pulse width to slightly less than 120 electrical degrees when the battery 20 is in a new condition. Thus, when the battery voltage decreases the voltage across condenser 78 will decrease causing the pulse width to increase somewhat to hold the average power out of the amplifier 14 relatively constant, but will increase the pulse width to only slightly above 120 electrical degrees thereby still effectively eliminating the third harmonic from the square wave.

Thus, the wave form 100 from the first multivibrator and the wave form 102 from the second multivibrator, both in the push pull amplifier 14, are provided to the output transformer 72 to produce the modified square wave form 13 in FIGURE 2. In the case of a 400 cycle signal the period is 2½ milliseconds and thus the period of a one-half cycle is 1¼ milliseconds. Since this is the duration for a 180 degree square wave, the duration of a 120 degree modified square wave is therefore .83 millisecond. Thus, the sound output to the driver 18 of the foghorn will be constant, and will have the same useful power output as would the conventional square wave form, but will only require approximately two-thirds of the battery power required for the conventional 180 electrical degree square wave.

It is believed that the method of the invention is apparent from the foregoing description of one embodiment of the apparatus of the invention. The method, however, comprises the steps of modifying a square wave to reduce the third harmonic component by reducing the wave pulse width to approximately 120 electrical degrees. The method further comprehends modifying a conventional electrical square wave having a pulse width of 180 electrical degrees to cancel the third harmonic by reducing the pulse width to approximately 120 degrees. The method further comprehends the method of modifying the pulse width of an electrical square wave and modulating that pulse width wherein the pulse width is provided from a battery source of power by reducing the pulse width of the square wave from 180 electrical degrees to slightly less than 120 electrical degrees, and then as the voltage of the battery decreases to slightly increase the pulse width of the square wave to hold the average power relatively constant.

The present invention, therefore, is well suited to carry out the objects and attain the ends and advantages mentioned as well as others inherent therein. While a presently preferred embodiment of the invention is given for the purpose of disclosure, numerous changes in the details of construction, arrangement of parts and steps of the process may be made which will readily suggest themselves to those skilled in the art and which are encompassed within the spirit of the invention and the scope of the appended claims.

What is claimed is:
1. A pulse width regulator comprising,
   an oscillator providing a square wave output,
   a push pull amplifier having a signal input connected to said oscillator output, said amplifier including a pair of one shot multivibrators,
   a battery voltage supply connected to and supplying the voltage for said amplifier,
   a timing circuit connected to and controlled by the output of said amplifier for shutting off each of said multivibrators after approximately 120 electrical degrees of conduction, and
   means in the timing circuit for increasing the pulse width as the battery voltage decreases thereby holding the average output power relatively constant.

2. An apparatus for powering an electrical horn for conserving battery power comprising,
   a battery,
   an oscillator connected to the battery for providing a square wave output in which the pulse width is approximately 180 electrical degrees,
   a push-pull amplifier having a signal input connected to said oscillator output, said amplifier including a pair of one shot multivibrators,
   a horn connected to the output of the amplifier,
   a timing circuit connected to and controlled by the output of said amplifier for shutting off each of said multivibrators at slightly less than 120 electrical degrees of conduction, and
   means in the timing circuit for increasing the pulse width as the battery voltage decreases thereby holding the average output power relatively constant.

References Cited

UNITED STATES PATENTS

| | | | |
|---|---|---|---|
| 3,284,796 | 11/1966 | Borsattino et al. | 340—384 |
| 3,018,390 | 1/1962 | Yourke et al. | 307—88.5 |
| 3,021,488 | 2/1962 | Edson | 328—207 X |
| 3,041,472 | 6/1962 | Ingman | 307—88.5 |
| 3,065,429 | 11/1962 | Merkel | 307—88.5 X |
| 3,067,343 | 12/1962 | Roscoe | 307—88.5 |
| 3,108,265 | 10/1963 | Moe | 307—88.5 X |
| 3,109,994 | 11/1963 | Gifford | 330—15 X |
| 3,209,173 | 9/1965 | Rumble | 328—58 X |
| 3,244,909 | 4/1966 | Henderson | 307—88.5 |
| 3,268,738 | 8/1966 | Deavenport | 307—88.5 |

FOREIGN PATENTS

| | | |
|---|---|---|
| 703,144 | 2/1965 | Canada. |

ARTHUR GAUSS, *Primary Examiner.*

R. H. PLOTKIN, *Assistant Examiner.*

U.S. Cl. X.R.

307—266, 268; 328—58; 340—210, 384